May 3, 1932.  G. F. HITCHCOCK  1,856,914

AIR RELEASE VALVE

Filed Aug. 20, 1928

Inventor
Guy F. Hitchcock
By Hardway & Cathey
Attorneys

Patented May 3, 1932

1,856,914

UNITED STATES PATENT OFFICE

GUY F. HITCHCOCK, OF HOUSTON, TEXAS, ASSIGNOR OF ONE-THIRD TO THOMAS H. MEEKS AND ONE-THIRD TO JOE L. TOMLINSON, BOTH OF HARRIS COUNTY, TEXAS

AIR RELEASE VALVE

Application filed August 20, 1928. Serial No. 300,705.

This invention relates to new and useful improvements in an air release valve.

One object of the invention is to provide novel type of release valve, adapted to be applied directly to an air pressure reservoir or the extension pipe leading therefrom forming part of the air brake system of railway trains and whereby the air pressure may be easily relieved from said reservoir.

Another object of the invention is to provide an air release valve of the character described which, when opened, will remain open until the air pressure in the reservoir has been reduced to the desired pressure and will then automatically close.

A further feature of the invention is to provide an air release valve, specially adapted for application to the air pressure reservoir, or line, of an air brake system, and which will automatically release an overcharge of air pressure and after such release will automatically close.

A further feature of the invention is to provide an air release valve which may be operated from either side of a railway car, which is of very simple construction and may be easily operated and readily applied.

With the above and other objects in view this invention has particular relation to certain novel features of construction, operation and arrangement of parts, an example of which is given in this specification and illustrated in the accompanying drawings wherein:—

Figure 2:
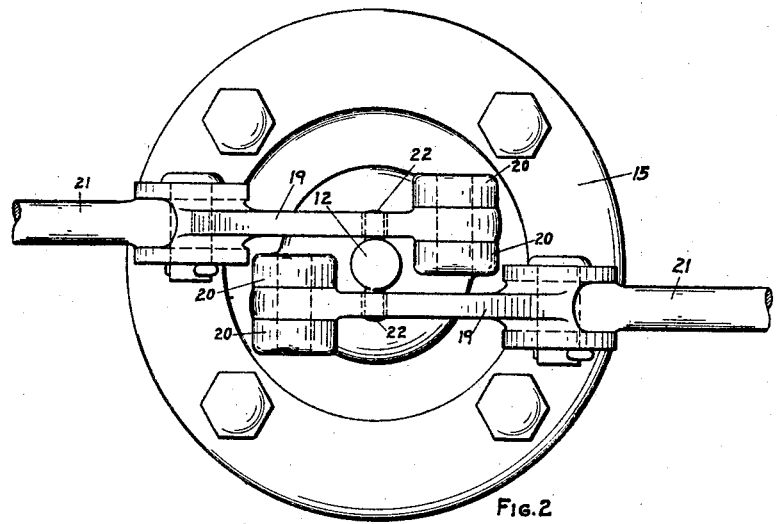
Figure 1:
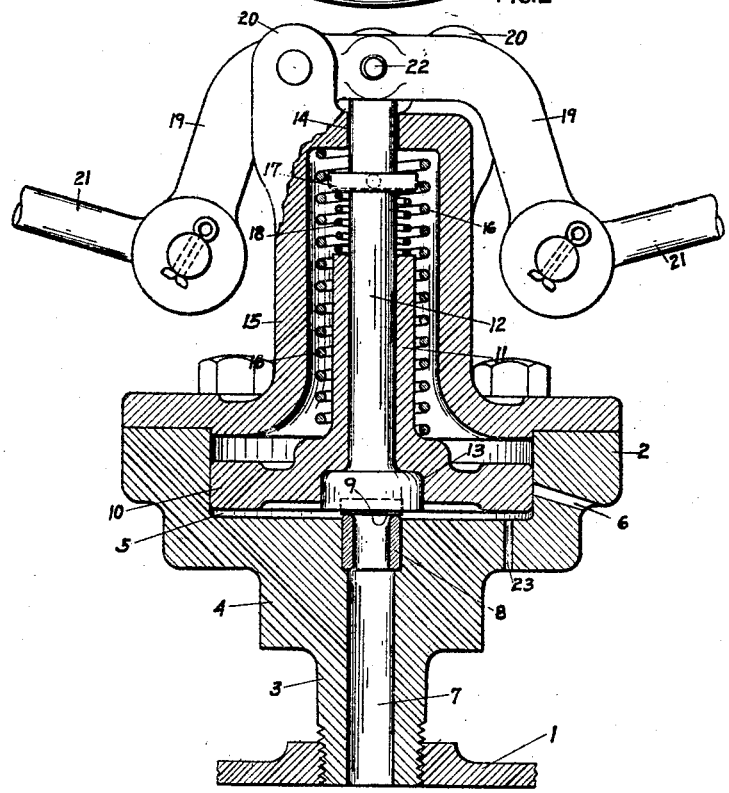

Figure 1 shows a vertical sectional view of the valve applied to an air pressure reservoir, and Figure 2 shows a plan view thereof.

Referring now more particularly to the drawings wherein like numerals of reference designate similar parts in each of the figures the numeral 1 designates the air pressure reservoir or cylinder usually carried beneath the railway car. There is a valve body 2 whose lower end 3 is reduced and outwardly threaded and thus adapted to be screwed into a tapped hole in the reservoir, or an air line connected therewith. Above the reduced end 3 the body is square or hexagonal in shape so as to receive a wrench for screwing the valve in place.

The upper part of the valve body is formed into a cylinder 5, having a lateral relief port 6. An air relief conduit 7 leads up through the body 2 from the interior of the reservoir and terminates in the cylinder 5. Driven into the upper end of this relief conduit there is a tubular valve seat 8 and a valve 9 cooperates with said seat to normally close the relief conduit.

There is a plunger 10 which works in the cylinder 5 and which is formed with an upstanding sleeve like bearing 11 through which the upstanding valve stem 12 works. The lower end of this stem carries the valve 9 and is enlarged and normally seated in the central recess 13 in the underside of the plunger 10. The upper end of the stem 12 works through a central bearing 14 in the cap 15. This cap is bolted onto the body 2 and encloses a coil spring 16 which surrounds the bearing 11 and is interposed between the cap and plunger and normally holds the valve 9 in closed position, also holding the plunger 10 in position to close the port 6.

Fixed on the stem 12 and spaced beneath the upper end of the cap 15 there is an annular stop 17 and interposed between this stop and the bearing 11 there is a light coil spring 18.

On opposite sides of the upper end of the stem 12 are the valve operating levers 19, 19. These levers are pivoted at one end between the respective ears 20, 20 upstanding from the cap 15 and disposed on opposite sides of the stem 12.

The free ends of these levers are disposed in opposite directions and are downwardly curved and their other ends are connected to the inner ends of the operating rods 21, 21. The outer ends of these rods are accessible under the respective sides of the car beneath which the reservoir is located.

The upper end of the stem 12 carries the oppositely disposed studs 22, 22 which work through bearings in the respective levers 19.

Normally, the air pressure in the reservoir will not be sufficient to lift the valve 9 and the plunger 10 on account of the small area of the valve 9 against which the pressure may operate. In order to relieve the pressure in the reservoir either rod 21 may be pulled outwardly which will operate to elevate the free end of the corresponding lever 19 and the plunger 10 will thereby be slightly lifted to admit air into the cylinder 5 and on account of the large plunger area against which the air, under pressure may operate, the plunger will be lifted by said pressure to uncover the port 6 and the pressure in the reservoir will thereupon be reduced to such a point that the air brakes will be released. Thereupon the spring 16 will force the plunger 10 and valve 9 downwardly and close the port 6 and the relief conduit 7. If it be desired, at any time, to close the conduit 7, before the plunger descends, to cut off the air from the cylinder 5 either rod 21 may be forced inwardly and this will operate to seat the valve 9 in advance of the descent of the plunger 10.

In case of overcharge, say above one hundred twenty pounds, in the cylinder 1 the pressure of the spring 16 will be overcome and the valve 9 and plunger 10 will be forced open and will release the air pressure in said reservoir and reduce the pressure to about 30 pounds and thereupon the spring 16 will cause the valve 9 to close and the cylinder 10 to return to original position. When valve 9 is opened were it not held firmly seated in the recess 13, air would pass up through the bearing 11 around the rod 12 to equalize pressure on both sides.

As the plunger 10 moves downwardly the air in the cylinder will be forced out through the relief port 23 which port also prevents the accumulation of air in the cylinder which might leak past the seat 9 and prematurely lift the plunger 10 and release the air pressure in the reservoir.

While I have shown what I now consider to be the preferred form of the invention it is obvious that mechanical changes may be made therein and equivalents substituted for the parts shown and I reserve the right to make such changes as may be found desirable within the principle of the invention.

What I claim is:—

1. A valve including a valve body formed with a cylinder for containing fluid under pressure and having a relief conduit entering the cylinder and a relief port leading therefrom, a plunger in the cylinder normally closing said port, a valve associated with the plunger and independently movable relative thereto, and normally closing said conduit, means normally over coming said pressure and holding said plunger and valve in closed position, oppositely disposed levers operatively connected to the valve, through either of which the valve and plunger may be moved to open said conduit and port.

2. A valve including a valve body formed with a cylinder for pressure fluid and having an air inlet conduit and a relief port, a plunger in the cylinder arranged to normally close said port, a yieldably mounted valve arranged to normally close said conduit, a yieldable member operating against the plunger, and adapted to over come said pressure and hold the valve and plunger in their said normal positions, a pair of levers operatively connected with the valve through either of which the valve and plunger may be moved to open said conduit and port.

3. A valve including a valve body formed with a cylinder and having a pressure relief conduit entering the cylinder and a pressure relief port leading from the cylinder, a cap fastened to said body and having a bearing, a plunger in the cylinder adapted to close said port, said plunger having an axial bearing, a valve stem working through said bearings whose lower end is provided with a valve adapted to close said conduit, a yieldable member interposed between the cap and plunger, a yieldable member on which said stem is supported, levers pivoted to said cap and operatively connected to said stem.

4. A valve including a valve body formed with a cylinder having an air relief conduit entering the cylinder and an air relief port leading from the cylinder, a plunger in the cylinder normally blocking said port, said plunger having an axial bearing, a valve stem working through said bearing, a valve carried by the stem which normally closes said relief conduit, a cap on said body formed with a bearing through which the said stem works, a yieldable member operating against the plunger and normally holding the plunger and valve in position to close said port and conduit and means connected to the stem through which the plunger and valve may be moved to open said conduit and port.

5. A valve including a valve body formed with a cylinder and having an inlet conduit, a valve seat in the end of said conduit which terminates in the cylinder, said cylinder also having a relief port, a plunger in said cylinder normally blocking said relief port, a yieldably supported valve associated with the plunger and adapted to cooperate with said seat, a cap secured to said body and formed with a bearing, a stem attached to said valve and working through said bearing, a yieldable member interposed between the cap and plunger, a lever having a pivotal connection with the outer end of said stem, one end of said lever being pivoted to said cap, an operating rod connected to the other end of said lever.

6. A valve mechanism including a body, formed with the cylinder and having a pressure release conduit and an air relief port, a plunger in the cylinder normally blocking said port, a valve which normally blocks said conduit, a cap on said body and having a bearing, a stem on the valve and working through said bearing and operatively connected with, and movable independently of, the plunger, a pair of levers on the cap and operatively connected with said stem, operating rods connected to said levers and a yieldable member acting against the plunger and normally holding the plunger and valve in position to close said port and conduit respectively.

7. A valve mechanism including a body having a bearing and formed with a cylinder and having a pressure relief conduit and an air relief port, a plunger in the cylinder normally blocking said port and having an axial bearing, a stem, a valve on said stem, which controls said conduit said stem working through said bearings, a yieldable seat on the stem against which the plunger is seated, a lever connected to the outer end of said stem, an operating rod connected to the lever and a yieldable member operating against the plunger and normally holding said plunger and valve in position to close said port and conduit respectively.

8. A valve including a body having a cylinder and provided with a relief conduit entering the cylinder and a relief port leading therefrom, a plunger in the cylinder normally closing said port, a valve associated with the plunger and normally closing said conduit, means normally holding said plunger and valve in position to close said port and conduit respectively, means for manually actuating the valve and plunger into open positions, said actuating means being effective to move said valve, independent of the plunger, to close said conduit in advance of the closing of the port by said plunger.

In testimony whereof I have signed my name to this specification.

GUY F. HITCHCOCK.